March 15, 1938.  S. F. CRUMBACK  2,111,178
PROPELLER
Filed Oct. 25, 1937
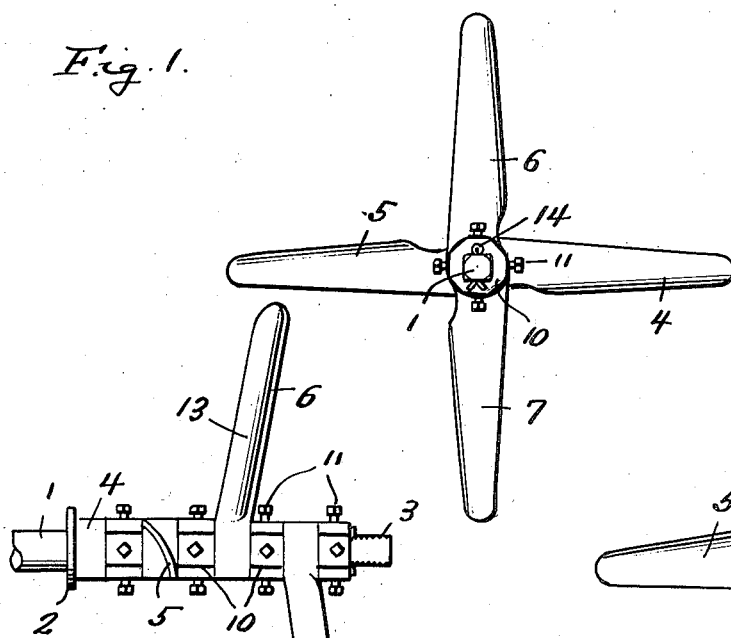
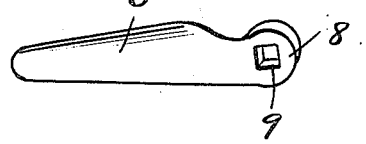
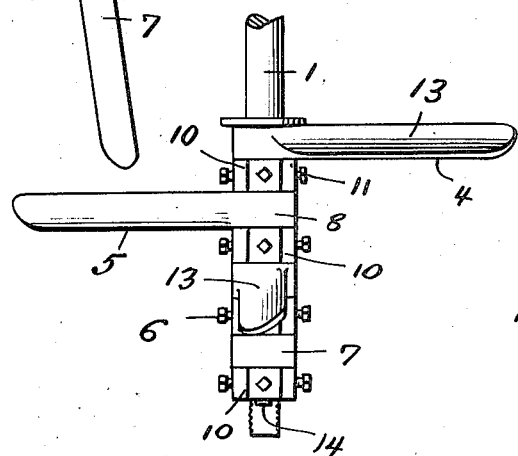
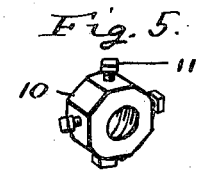
Inventor
Sylvester F. Crumback
By Clarence A. O'Brien
Hyman Berman
Attorneys Patented Mar. 15, 1938

2,111,178

UNITED STATES PATENT OFFICE 2,111,178

PROPELLER

Sylvester F. Crumback, Lincoln, Ill.

Application October 25, 1937, Serial No. 170,880

1 Claim. (Cl. 170—165)

This invention relates to a propeller mainly designed for use on aircrafts, the general object of the invention being to provide a plurality of blades arranged in longitudinally spaced relation on a shaft so that each blade has a separate space of rotation which increases the action of the blades on the air.

Another object of the invention is to so form the blades that some of them will extend at substantially right angles from the shaft and others will be inclined forwardly with respect to the shaft, this arrangement acting to cause the forward blades to change the direction of the air so as to give the rear blades more power from this change of air current.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a front view of the invention.

Figure 2 is a top plan view thereof.

Figure 3 is a side view thereof.

Figure 4 is a front view of one of the blades.

Figure 5 is a perspective view of one of the nuts.

In this drawing, the numeral 1 indicates the propeller shaft which is formed with a collar 2 an appreciable distance from its front end and from this collar to the front end the shaft is made of substantially rectangular shape in cross section but has its corners formed with the screwthreads 3. The four blades 4, 5, 6 and 7, are formed separate from each other and each blade has a hub part 8 having a rectangular-shaped hole 9 therein for receiving the shaft. Between each pair of blades a nut 10 is placed, each nut having a threaded interior for engaging the threads 3 and each nut is clamped to the shaft by the set screws 11, one of these nuts 10 being placed at the end of the shaft to hold the forward blade 7 in place. The blades are placed a quarter turn from each other as shown in Figure 1 and the blades are, of course, spaced apart by the nuts so that each blade has its own space in which to rotate.

The two rear blades 4 and 5 extend at substantially right angles from the shaft but the two forward blades 6 and 7 slope forwardly at about five degrees. This arrangement is designed to change the direction of the air so as to give the rear blades more power by this change of air current. The blades are preferably formed of cast aluminum and are tapered from heel to point and they are gradually curved on the inner side to form a concave rear face 13 as shown in Figures 2 and 3. This gives the blades a greater hold on the air when the propeller is revolving. A cotter pin 14 passes through the front end of the shaft to hold the front nut 10 in position.

As will be seen the blades can be easily and quickly assembled on the shaft and, of course, different numbers of blades may be used and each blade rotates in its own space which gives the propeller more power.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention, what is claimed as new is:—

A propeller of the class described comprising a shaft having an elongated portion of non-circular shape in cross section to provide corners, said corners being threaded, a plurality of blades each having a hub at one end thereof formed with an opening of the same shape as the cross sectional shape of said portion of the shaft, to receive a part of said portion, said blades being circumferentially spaced apart, a collar at the rear portion of said non-circular part of the shaft, a plurality of nuts each having a circular threaded hole therein the walls of which are threaded to engage the threads of the corners of the shaft, one of these nuts being placed between each pair of hubs and one at the outer end of the shaft and engaging the outer face of the front hub, with the rear hub engaging the collar, each nut having a non-circular outer circumference and bolts passing through the nuts and engaging portions of the non-circular part of the shaft to lock the nuts to the shaft.

SYLVESTER F. CRUMBACK.